US007348987B2

(12) United States Patent
Willis et al.

(10) Patent No.: US 7,348,987 B2
(45) **Date of Patent: *Mar. 25, 2008**

(54) SPARSE REFRESH OF DISPLAY

(75) Inventors: Thomas E. Willis, Mountain View, CA (US); Steven L. Midford, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 11/273,001

(22) Filed: Nov. 14, 2005

(65) Prior Publication Data

US 2006/0061581 A1 Mar. 23, 2006

Related U.S. Application Data

(62) Division of application No. 10/010,524, filed on Dec. 7, 2001, now Pat. No. 6,995,771.

(51) Int. Cl.
*G09G 5/36* (2006.01)
*G09G 5/39* (2006.01)
*G06F 12/02* (2006.01)

(52) U.S. Cl. ........................ 345/545; 345/531; 345/544

(58) Field of Classification Search ................ 345/545, 345/531, 544
See application file for complete search history.

(56) References Cited

U.S. PATENT DOCUMENTS

| | | | |
|---|---|---|---|
| 4,958,378 | A | 9/1990 | Bell |
| 5,276,851 | A | 1/1994 | Thacker et al. |
| 5,333,016 | A | 7/1994 | Tsutsumi |
| 5,396,587 | A | 3/1995 | Reed et al. |
| 5,563,727 | A | 10/1996 | Larson et al. |
| 5,581,278 | A | 12/1996 | Sugai et al. |
| 5,670,993 | A | 9/1997 | Greene et al. |
| 5,835,082 | A | 11/1998 | Perego |
| 6,094,705 | A | 7/2000 | Song |
| 6,323,854 | B1 | 11/2001 | Knox et al. |
| 6,570,802 | B2 | 5/2003 | Ohtsuka et al. |
| 6,664,969 | B1 | 12/2003 | Emerson et al. |
| 6,995,771 | B2 | 2/2006 | Willis et al. |
| 2002/0085013 | A1 | 7/2002 | Lippincott |

OTHER PUBLICATIONS

"U.S. Appl. No. 10/010,524 Final Office Action mailed Jan. 16, 2004", 22 pgs.
"U.S. Appl. No. 10/010,524 Final Office Action mailed May 19, 2005", 10 pgs.
"U.S. Appl. No. 10/010,524 Non-Final Office Action mailed Aug. 14, 2003", 17 pgs.

(Continued)

*Primary Examiner*—Ulka Chauhan
*Assistant Examiner*—Dan Washburn
(74) *Attorney, Agent, or Firm*—Schwegman, Lundberg & Woessner, P.A.

(57) ABSTRACT

A method, apparatus, and signal-bearing medium for sending to a display device modified regions of a frame buffer. A frame buffer is divided into the regions, and data in the frame buffer represents pixels on the display device. The frame buffer accumulates writes until the region being written to changes, at which time the region is copied to the display device.

22 Claims, 6 Drawing Sheets

OTHER PUBLICATIONS

"U.S. Appl. No. 10/010,524 Non-Final Office Action mailed Nov. 22, 2004", 9 pgs.

"U.S. Appl. No. 10/010,524 Notice of Allowance mailed Aug. 12, 2005", 4 pgs.

"U.S. Appl. No. 10/010,524 Response filed Feb. 22, 2005 in response to Non-Final Office Action mailed Nov. 22, 2004", 11 pgs.

"U.S. Appl. No. 10/010,524 Response filed Mar. 16, 2004 in response to Final Office Action mailed Jan. 16, 2004", 11 pgs.

"U.S. Appl. No. 10/010,524 Response filed Jul. 19, 2005 in response to Final Office Action mailed May 19, 2005", 9 pgs.

"U.S. Appl. No. 10/010,524 Response filed Nov. 14, 2003 in response to Non-Final Office Action mailed Aug. 14, 2003", 12 pgs.

SPARSE REFRESH OF DISPLAY

RELATED APPLICATIONS

This application is a divisional application of, and claims priority to, U.S. patent application Ser. No. 10/010,524; filed on Dec. 7, 2001 now issued as U.S. Pat. No. 6,995,771; and entitled "Sparse Refresh of Display;" the disclosure of which is incorporated herein by reference.

FIELD

This invention relates generally to display devices and more particularly to displaying information on a display device.

BACKGROUND

Current systems use raster-based display refresh techniques to update their displays. Using this technique, a host electronic device transfers the entire displayed contents to the display device at a fixed rate, which is often called the "refresh rate" and is typically 60-85 Hz in prior systems. Each transfer typically moves a frame, also called a screen image, from the host to the display device by tracing the screen image from left-to-right and top-to-bottom on the display screen. This refresh is wasteful unless substantial portions of the screen image change at approximately the refresh rate.

For example, consider a user reading a news story from a web page. The content of the displayed page changes only as the user scrolls through the story; yet, current systems built on raster-refresh techniques expend energy and effort to repeatedly copy the same data, i.e., the screen contents, from the host to the display. This repeated copying inefficiently uses power and bandwidth between the host and the display.

DETAILED DESCRIPTION

Figure 1:
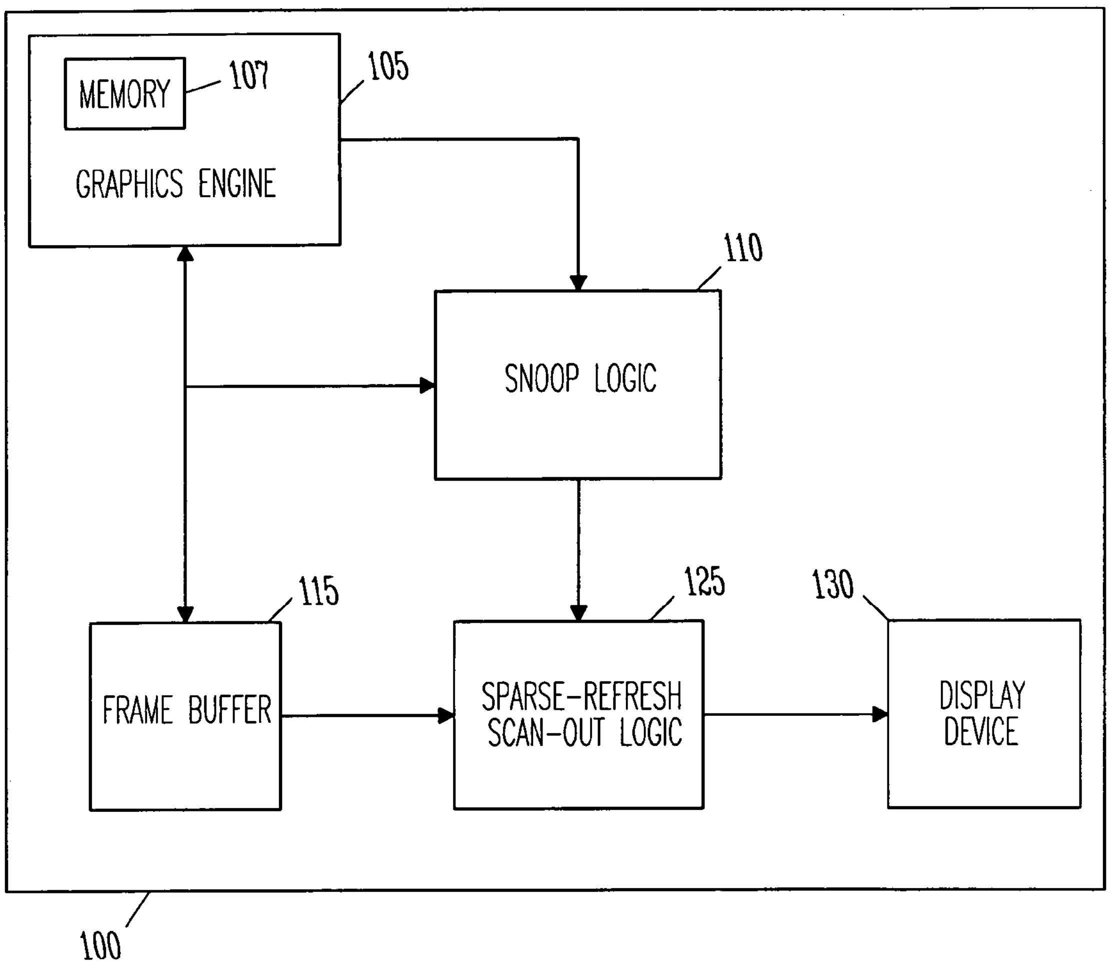
FIG. 1 depicts a block diagram of a electronic device for implementing an embodiment of the invention.

FIG. 1 depicts a block diagram of an electronic device 100 for implementing an embodiment of the invention. The electronic device 100 may include a graphics engine 105, a snoop logic 110, a frame buffer 115, a sparse-refresh scan-out logic 125, and a display device 130. Although the graphics engine 105, the snoop logic 110, the frame buffer 115, the sparse-refresh scan-out logic 125, and the display device 130 are drawn as being separate entities, in other embodiments some or all may be packaged together. The electronic device 100 may be implemented using any suitable hardware and/or software, such as a personal computer available from a number of vendors. But, other examples may be portable computers, network computers, laptop or notebook computers, PDAs (Personal Digital Assistants), mainframe computers, or any other suitable electronic devices.

The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports displaying information on a display device.

The graphics engine 105 generates graphics or text for display on the display device 130. In an embodiment, the graphics engine 105 may be implemented as hardware logic. In another embodiment, the graphics engine 105 may be implemented as instructions within memory that are executable on a processor. Although the graphics engine 105 is drawn as being part of the electronic device 100, in another embodiment the graphics engine 105 may be external to the electronic device 100. The graphics engine 105 may be connected to the snoop logic 110 and the frame buffer 115. The graphics engine 105 may include a memory 107, in which write commands to the buffer 115 are buffered. Although the memory 107 is shown contained within the graphics engine 105, in another embodiment the memory 107 is external to the graphics engine 105, either internal to the electronic device 100 or external to the electronic device 100. In another embodiment, the memory 107 is not present or not used. The functions of the graphics engine 105 are further described below with reference to FIG. 5.

Referring again to FIG. 1, the snoop logic 110 identifies modified regions of the frame buffer 115 and tracks regions that have not yet been sent to the display device 130. The snoop logic 110 may be communicatively coupled to the graphics engine 105, the frame buffer 115, and the sparse-refresh scan-out logic 125. Portions of the snoop logic 110 are further described below with reference to FIGS. 3 and 4. In an embodiment, the snoop logic 110 may be implemented as hardware logic. In another embodiment, the snoop logic 110 may be implemented as instructions within memory that are executable on a processor. Although the snoop logic 110 is drawn as being a part of the electronic device 100, in another embodiment the snoop logic 110 may be external to the electronic device 100.

The frame buffer 115 is a region of memory that holds the image to be displayed on the display device 130. The frame buffer 115 may be comprised of a single plane that contains data for all color components to be displayed on the display device 130 or may be comprised of independent planes that each contain the data for one color component. In another embodiment, the frame buffer 115 may contain values that are indexes into a table of colors. In other embodiments, other organizations of the frame buffer 115 may be used. The frame buffer 115 may be local to a graphics sub-system or may be shared with other agents. In an embodiment, the frame buffer 115 may be implemented as an adapter card. The frame buffer 115 may be communicatively coupled to the graphics engine 105, the snoop logic 110, and the sparse-refresh scan-out logic 125. Example contents of the frame buffer 115 are further described below with reference to FIG. 2.

Referring again to FIG. 1, the sparse-refresh scan-out logic 125 writes a selected region or regions within the frame buffer 115 to the display device 130 when so instructed by the snoop logic 110. The sparse-refresh scan-out logic 125 writes the selected region or regions to the display device 130 asynchronously from the writes from the graphics engine 105 to the frame buffer 115. The sparse-refresh scan-out logic 125 may include instructions in memory capable of being executed on a processor to carry out the functions of the present invention. In another embodiment, some or all of the functions of the sparse-refresh scan-out logic 125 may be carried out via hardware in lieu of a processor-based system. The sparse-refresh scan-out logic 125 may be communicatively coupled to the snoop logic 110, the frame buffer 115, and the display device 130.

The sparse-refresh scan-out logic 125 uses requests from the snoop logic 110 to drive the scan-out operation. In an embodiment, sparse-refresh the scan-out logic 125 may replace raster-based logic used in graphics controllers. The sparse-refresh scan-out logic 125 may copy the region specified by the snoop logic 110 from the frame buffer 115 to the display device 130. The sparse-refresh scan-out logic 125 may format pixels from the frame buffer 115 in the appropriate format for presentation on the display device 130. Because a modified region is sent to the display device 130 asynchronously to graphics operations, a region might be further modified while the sparse-refresh scan-out logic 125 is copying the region to the display device 130. Depending on whether or not the newly modified pixels have been scanned out, these modifications may or may not be reflected in the information that the sparse-refresh scan-out logic 125 sends to the display device 130.

To address this potential problem, in one embodiment the sparse-refresh scan-out logic 125 may have the highest priority access to the frame buffer 115. The highest priority access may be implemented by a number of techniques. In an embodiment, the highest priority access is implemented by the graphics engine 105 holding off all write operations to the frame buffer 115 while the sparse-refresh scan-out logic 125 is reading the frame buffer 115. In an embodiment, the graphics engine 105 buffers write operations while the sparse-refresh scan-out logic 125 is reading the frame buffer 115. In another embodiment, the graphics engine 105 detects which region that the sparse-refresh scan-out logic 125 is reading from the frame buffer 115 and only buffers those writes directed to that region while allowing write operations to other regions within the frame buffer 115 to proceed. These functions of the graphics engine 105 are further described below with reference to FIG. 5.

The display device 130 communicates information to the user of the electronic device 100. The display device 130 may be communicatively coupled to sparse-refresh the scan-out logic 125. The display device 130 may be a cathode-ray tube (CRT) based video display well known in the art of computer hardware. But, in other embodiments the display device 130 may be replaced with a liquid crystal display (LCD) based or gas, plasma-based, flat-panel display. In still other embodiments, any appropriate display device may be used. Although only one display device 130 is shown, in other embodiments, any number of display devices of different types or of the same type may be present. Although the display device 130 is drawn as part of the electronic device 100, in other embodiments the display device 130 may be external to the electronic device 100.

As will be described in detail below, aspects of an embodiment pertain to specific apparatus and method elements implementable on electronic devices. In another embodiment, the invention may be implemented as a program product for use with a electronic device. The programs and data structures defining the embodiment may be delivered to a electronic device via a variety of signal-bearing media, which include, but are not limited to:

(1) information permanently stored on a non-rewriteable storage medium (e.g., read-only memory devices attached to or within a electronic device, such as a CD-ROM readable by a CD-ROM drive, or any other type of non-rewriteable storage medium);

(2) alterable information stored on a rewriteable storage medium (e.g., a hard disk, diskette, tape, random-access memory device, or any other type of rewriteable storage medium); or (3) information conveyed to a electronic device by a communications medium, such as through a computer or telephone network accessed via a network adapter, including wireless communications.

Such signal-bearing media, when carrying processor-readable instructions that direct the functions of the present invention and/or data organized in a data structure, represent embodiments of the present invention.

Figure 2:
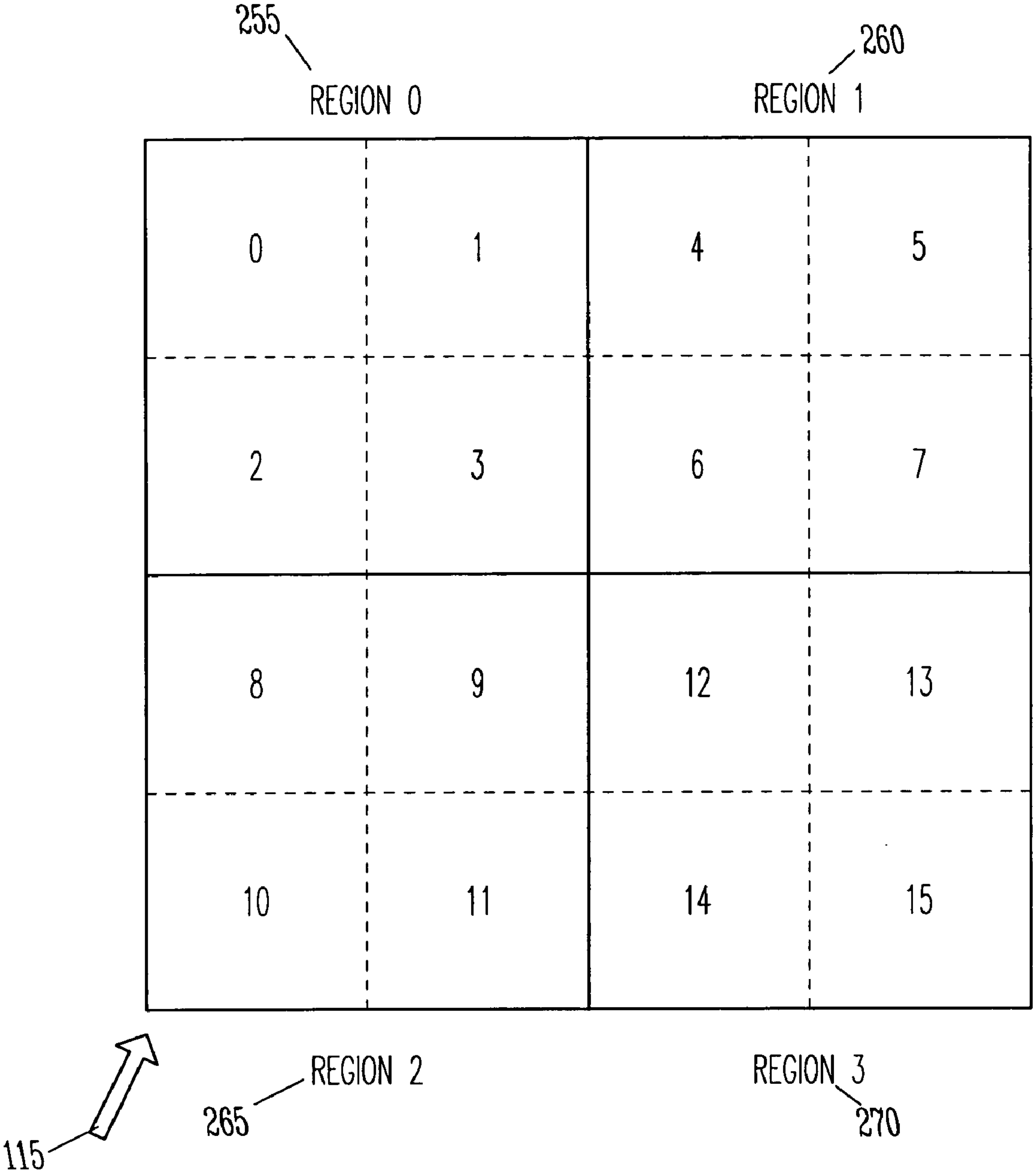
FIG. 2 depicts a block diagram of an example frame buffer using addressing by regions, according to an embodiment of the invention.

FIG. 2 depicts a block diagram of example contents of the frame buffer 115 using a region addressing technique, according to an embodiment of the invention. Example contents of the frame buffer 115 show an addressing scheme in which the screen of the display device 130 is divided into a number of x-pixel by y-pixel regions. The pixels for each region are packed into the frame buffer 115 using linear addressing. That is, the first xy pixels in the frame buffer 115 correspond to the first area; the second xy pixels correspond to the adjacent area, and so forth.

FIG. 2 illustrates addressing for a 4-pixel square frame buffer without padding between regions. But, in another embodiment, there may be padding between rows within an area and between areas. Each square corresponds to a pixel on the display device 130, and the number in each square indicates the position in the frame buffer 115. The solid lines indicate the region boundaries and the dashed lines indicate pixel boundaries with the regions being 2-pixels square. Thus in the example shown, region 0 (255) contains pixels 0, 1, 2, and 3; region 1 (260) contains pixels 4, 5, 6, and 7; region 2 (265) contains pixels 8, 9, 10, and 11; and region 3 (270) contains pixels 12, 13, 14, and 15. In another embodiment, the pixels may be represented in another order within the regions. An organization of regions in the frame buffer 115 provides better locality in the reference stream for the frame buffer 115 for most drawing operations. Giving the 2-dimensional spatial coherence typical of screen drawing, it is desirable to locate nearby pixels, in both the horizontal and vertical directions, as close as possible within the frame buffer.

Although the example of FIG. 2 is drawn to contain four regions with four pixels each, in other embodiments any number of regions and pixels may be present. Although the example of FIG. 2 is drawn with regions having a square shape, in other embodiments any region shapes may be used. Although the example of FIG. 2 is drawn with contiguous regions, in other embodiments, the regions need not be contiguous. Although FIG. 2 is drawn with each of the regions having the same number of pixels, in other embodiments some or all of the regions may contain a different number of pixels. Although FIG. 2 is drawn with regions not overlapping, in another embodiment the regions may overlap.

Figure 3:
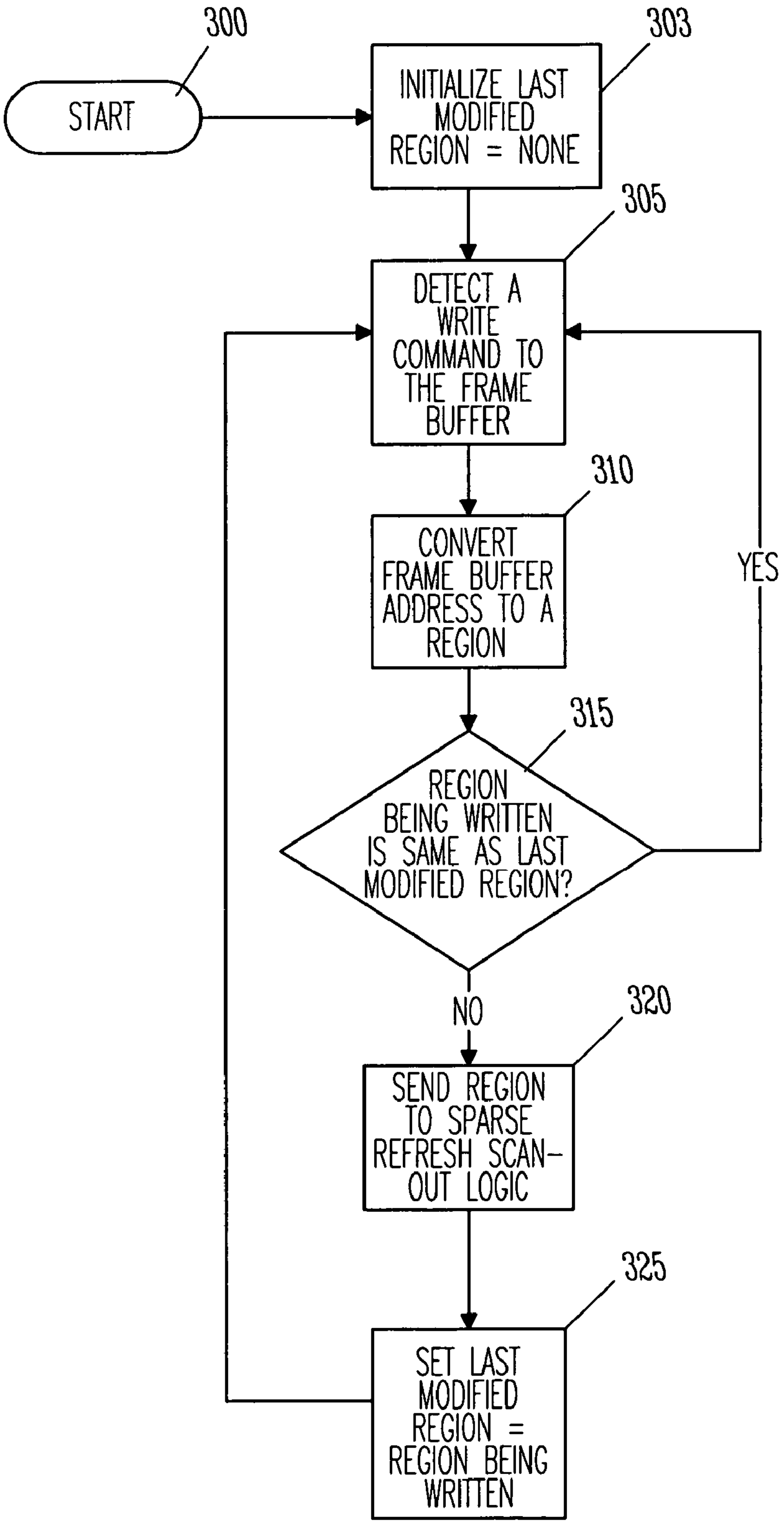
FIG. 3 depicts a flowchart of example processing for a write command, according to an embodiment of the invention.

FIG. 3 depicts a flowchart of example processing for the snoop logic 110, according to an embodiment of the invention. Control begins at block 300. Control then continues to block 303 where the snoop logic 110 initializes the last modified region to be none. The last modified region is a variable that will be used later in the processing of FIG. 3. Control then continues to block 305 where the snoop logic 1110 detects a write operation from the graphics engine 105 to the frame buffer 115.

Control then continues to block 310 where the snoop logic 110 determines the region associated with the frame buffer write command. In an embodiment, the snoop logic 110 determines the region by using a lookup table that maps a frame buffer address to a region number. In another embodiment, the snoop logic 110 determines the region using a logical transformation. Control then continues to block 315 where the snoop logic 110 determines whether the region previously determined at block 310 is the same as the last modified region. If the determination at block 315 is true, then control returns to block 305, as previously described above.

If the determination at block 315 is false, then control continues to block 320 where the snoop logic 110 instructs the sparse-refresh scan-out logic 125 to send the region from the frame buffer 115 to the display 130. Control then continues to block 325 where the snoop logic 110 sets the last modified region to be the region being written. Control then returns to block 305, as previously described above.

Thus, as illustrated by FIG. 3, the snoop logic 110 causes the frame buffer 115 to accumulate writes by the graphics engine 105 to a first region in the frame buffer 115 until the graphics engine 105 writes to a different region in the frame buffer 115. When the graphics engine 105 writes to the different region, the snoop logic 110 causes the sparse-refresh scan-out logic 125 to write the first region from the frame buffer 115 to the display device 130.

Figure 4:
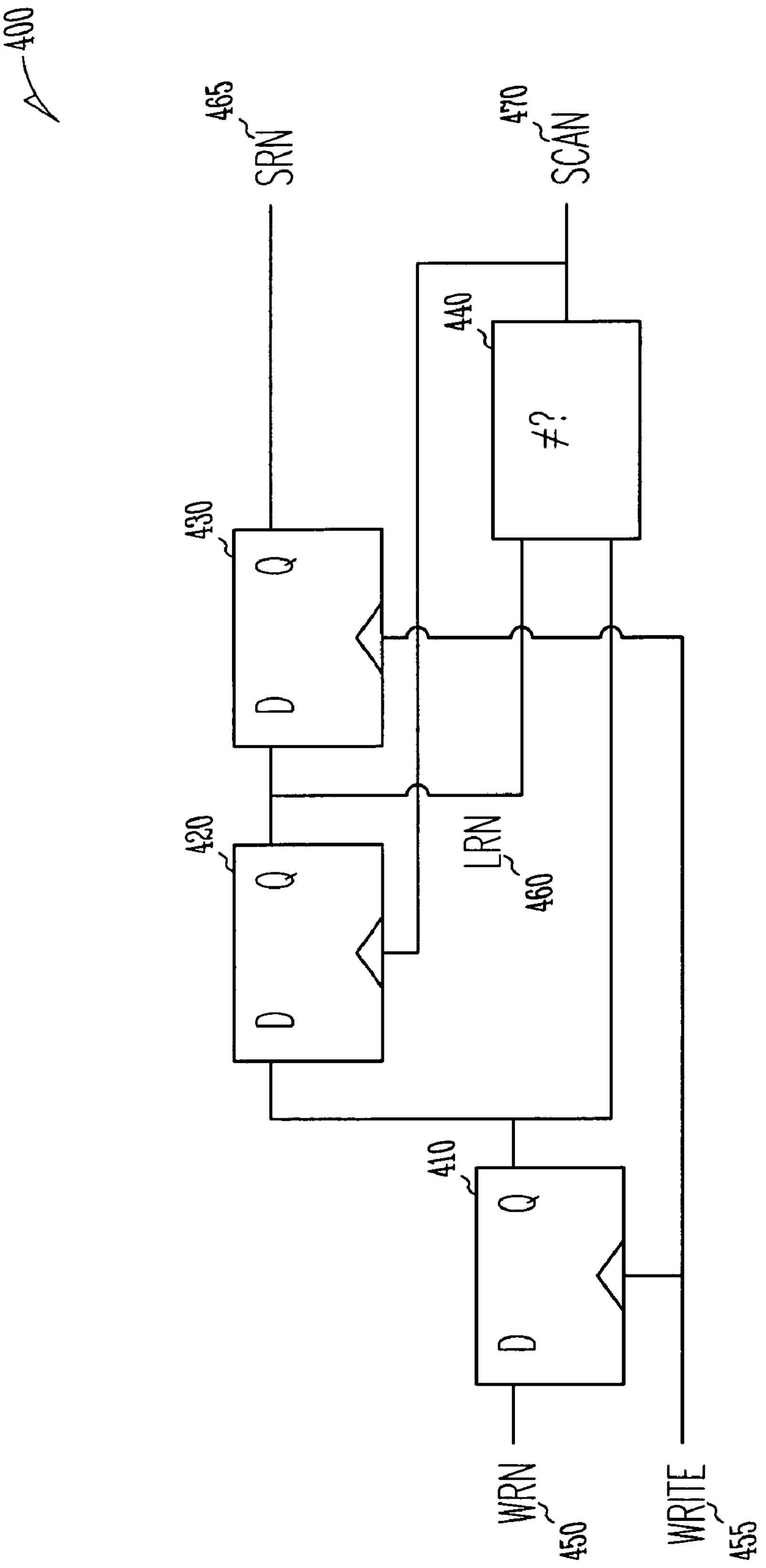
FIG. 4 depicts a block diagram of example snoop logic, according to an embodiment of the invention.

FIG. 4 depicts a block diagram of example logic 400 for implementing the snoop logic 110, according to an embodiment of the invention. The logic 400 may include D-type flip-flops 410, 420, and 430, and the compare logic 440. Using the standard nomenclature for flip-flops in FIG. 4, "Q" indicates output, "D" indicates data, and a triangle symbol indicates a clock input.

The d-type flip-flop 410 receives WRN 450 as a data input. The WRN 450 may be the region number of the region currently being written by the graphics engine 105 to the frame buffer 115. The d-type flip-flop 410 receives the write 455 as a clock input. The write 455 may be high when the snoop logic 110 detects that the write from the graphics engine 105 to the frame buffer 115 has occurred. Thus, the write 455 indicates when the WRN 450 is valid. The d-type flip-flop 410 produces Q output, which serves as data input to the d-type flip-flop 420 and the compare logic 440.

The d-type flip-flop 420 receives as data input the Q output of the d-type flip-flop 410. The d-type flip-flop 420 also receives a clock signal from the output of the compare logic 440. The d-type flip-flop 420 produces Q output of the LRN 460, which is the region number of the last modified region. The LRN 460 is input to the d-type flip-flop 430 and the compare logic 440.

The d-type flip-flop 430 receives as D input the Q output of the d-type flip-flop 420. The d-type flip-flop 430 also receives a clock signal from the write 455. The d-type flip-flop 430 produces as Q output the SRN 465, which is the region number of the region to be sent to the display device 130. The SRN 465 is input to the sparse-refresh scan-out logic 125.

The comparator 440 may be logic that receives as input the LRN 460 and the Q output of the d-type flip-flop 410 and determines whether the two input signals are equal. In an embodiment, the compare logic 440 may be implemented as an exclusive-or gate. But, in other embodiments any appropriate logic may be used. The comparator 440 produces as output the SCAN 470, which is input to the sparse-refresh scan-out logic 125 and indicates when the sparse-refresh scan-out logic 125 should send the region identified by the SRN 465 to the display device 130.

Figure 5:
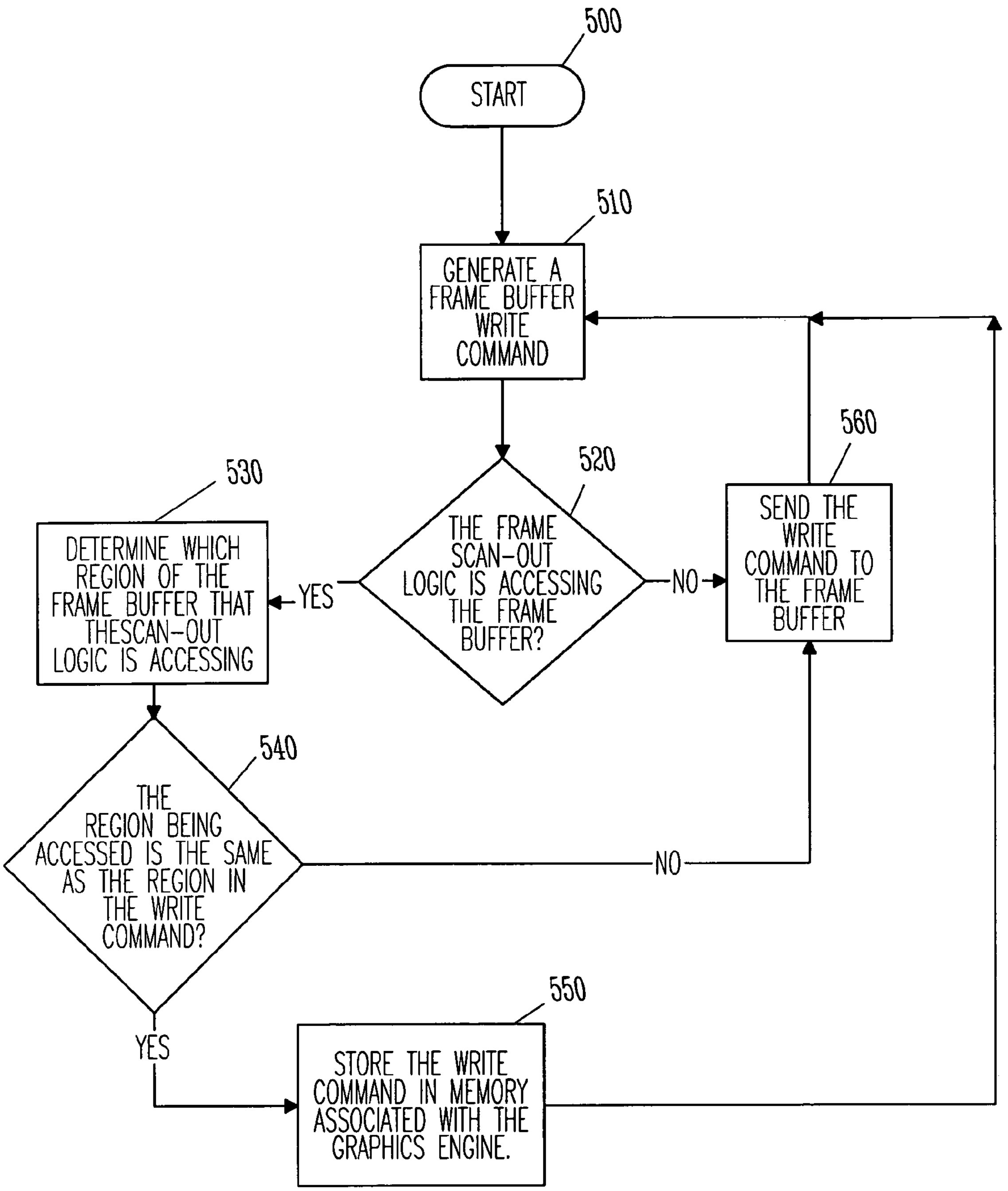
FIG. 5 depicts a flowchart of example processing for a graphics engine, according to an embodiment of the invention.

FIG. 5 depicts a flowchart of example processing for the graphics engine 105, according to an embodiment of the invention. Control begins at block 500. Control then proceeds to block 510 where the graphics engine 105 generates a frame buffer write command. The graphics engine 105 may generate a frame buffer write command using data from an external source (not shown). In another embodiment, the graphics engine 105 may generate a frame buffer write command using its own data.

Control then continues to block 520 where the graphics engine 105 detects whether the frame buffer 115 is currently being accessed by the sparse-refresh scan-out logic 125. If the determination at block 520 is true, then control continues to block 530 where the graphics engine 105 determines which region of the frame buffer 115 is being accessed by the sparse-refresh scan-out logic 125.

Control then continues to block 540 where the graphics engine 105 determines whether the region that the sparse-refresh scan-out logic 125 is accessing in the frame buffer 115 is the same as the region in the frame buffer write command, which was previously generated at block 510. If the determination at block 540 is true, then control continues to block 550 where the graphics engine 105 stores the write command in the memory 107. Commands stored in the memory 107 are sent to the frame buffer 115 at a later time when the regions accessed in the buffered write command are not being accessed by the sparse-refresh scan-out logic 125.

If the determination at block 540 is false, then control continues to block 560 where the graphics engine 105 sends the write command to the frame buffer 115. Control then returns to block 510 as previously described above.

If the determination at block 520 is false, then control continues to block 560 where the graphics engine 105 sends the write command to the frame buffer 115. Control then returns to block 510 as previously described above.

Figure 6:
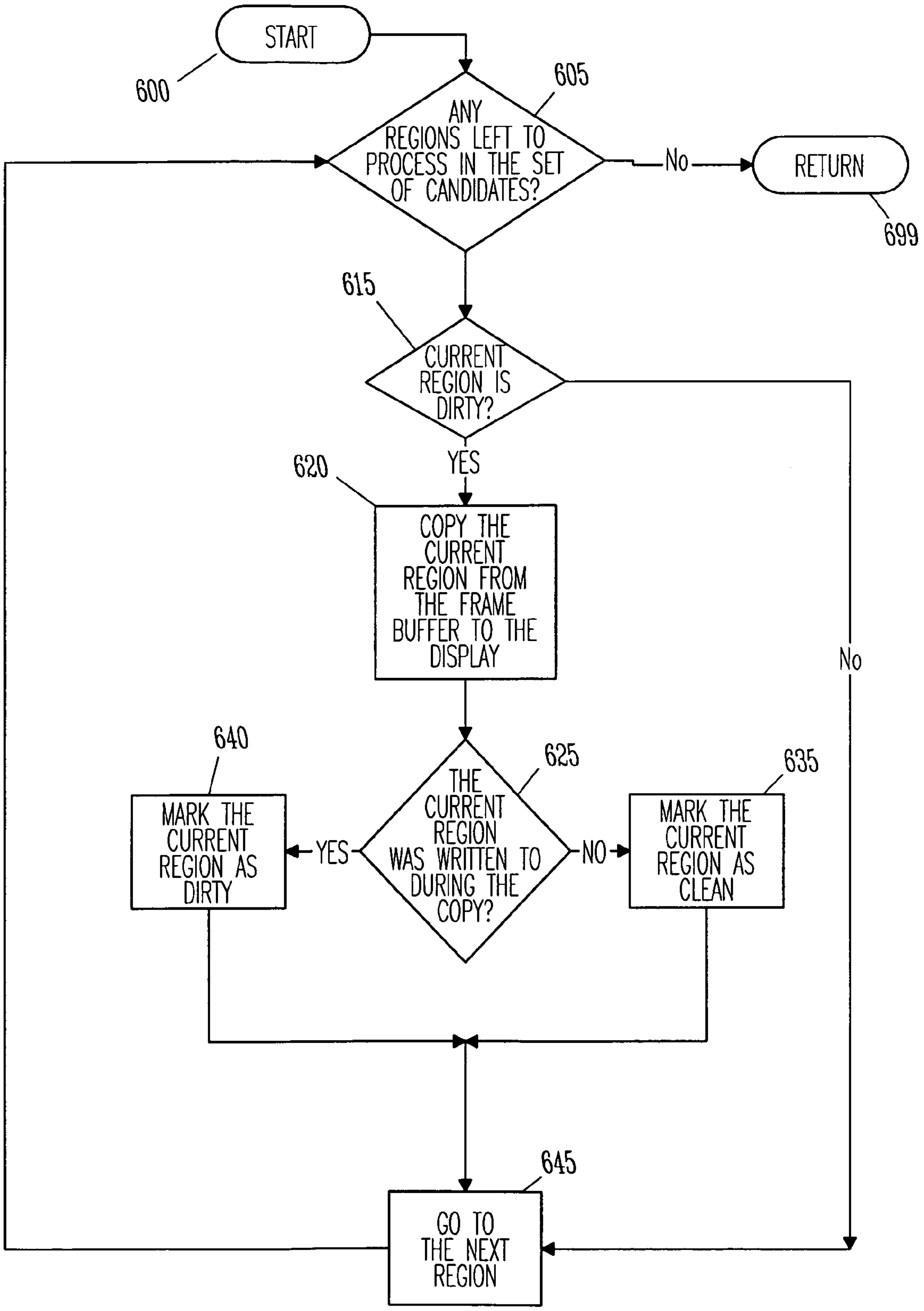
FIG. 6 depicts a flowchart of example processing for a graphics engine, according to an embodiment of the invention.

FIG. 6 depicts a flowchart of processing for the graphics engine 105, according to an embodiment of the invention.

Control begins at block 600. Control then continues to block 605 where the graphics engine 105 determines whether there are any regions left to process in a set of candidate regions. The set of candidate regions may be selected according to a variety of criteria, including all regions in the frame buffer 115, all regions that have not been written to in a period of time, all regions except a number of most-recently written to regions, a number of least-recently written to regions, and all regions that are being displaced from the frame buffer 115. But, in another embodiment any appropriate selection criteria may be used.

If the determination at block 605 is false, then control continues to block 699 where the logic returns.

If the determination at block 605 is true, then control continues to block 615 where the graphics engine 105 determines whether the current region is dirty (modified). If the determination at block 615 is false, then control continues to block 645 where the graphics engine 105 moves the current region to the next region. Control then returns to block 605, as previously described below.

If the determination at block 615 is true, then control continues to block 620 where the graphics engine 105 copies the current region from the frame buffer 115 to the display device 130. Control then continues to block 625 where the graphics engine 105 determines whether the current region in the frame buffer 115 was written to during the copy at block 620. If the determination at block 625 is false, then control continues to block 635 where the graphics engine 105 marks the current region to be clean, or unmodified. Control then continues to block 645, as previously described above.

If the determination at block 625 is true, then control continues to block 640 where the graphics engine 105 marks the current region to be dirty, or modified. The actions of blocks 625 and 640 are necessary because modified regions may be sent to the display device 130 asynchronously to graphics operations, so it is possible that a region may be further modified while the graphics engine 105 is copying the region to the display device 130. Depending on whether or not the newly modified pixels have been scanned out, these modifications may or may not be reflected in the data sent to the display device 130. As a result, the graphics engine 105 only marks a region as clean (unmodified) if there were no writes to the region during the scan-out process. Otherwise, the region is left marked dirty (modified). Control then continues to block 645, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The previous detailed description is, therefore, not to be taken in a limiting sense, and the scope of the present invention is defined only by the appended claims.

Numerous specific details were set forth to provide a thorough understanding of the invention. However, the invention may be practiced without these specific details. In other instances, well-known circuits, structures and techniques have not been shown in detail in order not to obscure the invention.

What is claimed is:

1. A method, comprising:

representing a frame buffer as a plurality of regions, each region having a plurality of pixels that span multiple different rows within each region, and wherein each region has a configurable shape;

accumulating writes to a first region of the plurality of regions within the frame buffer;

detecting a new write to a different region from that of the first region; and asynchronously writing the first region to a display device upon detection of the new write.

2. The method of claim 1, wherein accumulating, detecting, and asynchronously writing further includes processing the operations with a plurality of D-type flip-flops.

3. The method of claim 2, wherein processing further includes using at least one exclusive-or gate.

4. The method of claim 1, wherein accumulating, detecting, and asynchronously writing further includes processing the operations within a graphics engine or in cooperation with the graphics engine.

5. The method of claim 1, wherein representing further includes mapping the plurality of regions to locations within the display device.

6. The method of claim 1, wherein representing further includes representing each of the plurality of regions with a same number of the plurality of pixels.

7. The method of claim 1, wherein representing further includes representing a number of the plurality of regions with different numbers of the plurality of pixels from what represents other ones of the plurality of regions.

8. A computer-readable medium having instructions embedded thereon, the instructions when executed by a computer performing the method of:

segmenting a frame buffer into regions, each region having a configurable shape and having pixels that span multiple rows of that shape;

buffering writes to a first one of the regions within the frame buffer; and asynchronously updating the first one of the regions to a display once a different write to a different one of the regions is detected.

9. The medium of claim 8 further comprising instructions for mapping each region to a different location within the display.

10. The medium of claim 8, wherein segmenting further includes representing the configurable shape as a rectangle having a same dimension for each of the regions.

11. The medium of claim 8, wherein segmenting further includes representing the configurable shape differently with different dimensions for different ones of the regions.

12. An apparatus, comprising:

a frame buffer comprising a plurality of regions, wherein each region represents a respective plurality of pixels on a display device that spans more than one row of the respective plurality of the pixels and a shape of each region is configurable; and logic to accumulate writes by a graphics engine to one of the plurality of regions in the frame buffer until the graphics engine writes to another region of the plurality of regions in the frame buffer, wherein when the graphics engine writes to the another region, the logic is to cause the one region to be asynchronously written to the display device.

13. The apparatus of claim 12, wherein the logic comprises a plurality of D-type flip-flops.

14. The apparatus of claim 13, wherein one of the plurality of D-type flip-flops is to receive input of a region number of the one region and a clock input to be active when each of the respective writes occurs.

15. The apparatus of claim 13, wherein at least one of the D-type flip-flops includes an exclusive-or gate.

16. The apparatus of claim 12, wherein the logic is to identify each of the plurality of regions via region numbers or identifiers that is to be supplied by the graphics engine.

17. The apparatus of claim 12, wherein the logic is to flag each of the plurality of regions when a write is performed on that region by the graphics engine, and wherein the flag indicates a modification.

18. The apparatus of claim 17, wherein the logic is to clear the flag for a particular region if that region is written to the display device.

19. A system, comprising:

a frame buffer comprising a plurality of regions, wherein each region represents a respective plurality of pixels on a display device that spans more than one row of the respective plurality of the pixels and a shape of each region is configurable;

logic to accumulate writes by a graphics engine to one of the plurality of regions in the frame buffer until the graphics engine writes to another region of the plurality of regions in the frame buffer, wherein when the graphics engine writes to the another region, the logic is to cause the one region to be asynchronously written to the display device; and the display device to visually present the plurality of pixels and the writes associated therewith.

20. The system of claim 19, wherein the logic includes a plurality of D-type flip-flops.

21. The system of claim 19, wherein the logic is to convert addresses associated with writes to the frame buffer received from the graphics engine to specific ones of the plurality of regions.

22. The system of claim 19, wherein logic further includes:

snoop logic to cause the frame buffer to accumulate the writes; and scan-out logic to asynchronously write the one region to the display device.

* * * * *